May 9, 1950 P. T. NIMS 2,506,809
GENERATOR MOTOR DRIVING SYSTEM
Filed Aug. 12, 1947 3 Sheets-Sheet 1

INVENTOR.
Paul T. Nims.
BY
Harness and Harris
ATTORNEYS.

Fig. 3

Patented May 9, 1950

2,506,809

UNITED STATES PATENT OFFICE 2,506,809

GENERATOR-MOTOR DRIVING SYSTEM

Paul T. Nims, Detroit, Mich., assignor to Chrysler Corporation, Highland Park, Mich., a corporation of Delaware Application August 12, 1947, Serial No. 768,118

18 Claims. (Cl. 318—145)

REISSUED
DEC 26 1950
RE 23314

This invention relates to electrical controlling systems and more particularly to a system for driving a motor vehicle which is an improvement on the system shown in my co-pending application Serial No. 681,630, filed July 6, 1946, for Electric drive.

The principal objects of the present invention are to provide a system of the aforesaid type which is simple in arrangement, requiring a minimum number of structure elements, is relatively light in weight, and is reliable and efficient in operation; to provide a motor vehicle driving system which is operable to provide rapid acceleration from a condition of rest of the vehicle; to provide such a system in which the size and weight of the electrical elements are a minimum; to provide such a system in which the most efficient use of the electrical equipment is maintained at all conditions of operation; to provide such a system in which an alternator driven by the source of prime power comprises a plurality of windings which may be connected in parallel relationship for high current low voltage starting of the vehicle and of series operation at high voltage low current higher speed operation of the vehicle; to provide such a system in which alternating electrical power is rectified, by means of mechanically operated switches, to direct-current power for operation of the driving motors; to provide a controlling system for providing a wave shape of the alternating voltage and current whereby a sufficient time interval may be provided for actuation of the switches at substantially zero current flow therethrough; to provide such a controlling system which will automatically control in accordance with the power being transferred through the rectifying switches.

With the above as well as other more detailed objects in view, which appear in the following description and in the appended claims, preferred but illustrative embodiments of the invention are shown in the accompanying drawings throughout the several views of which corresponding reference characters are used to designate corresponding parts and in which:

Figure 1:
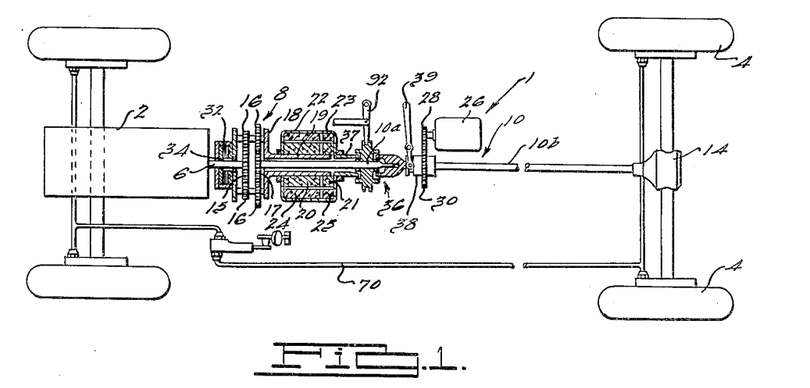
Figure 1 is a diagrammatic view of a vehicle chassis embodying the invention.
Figure 2:
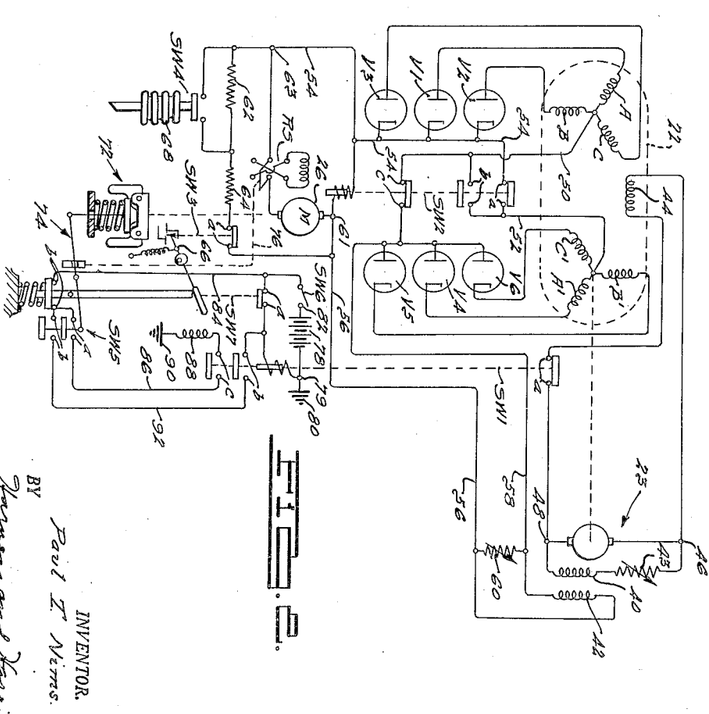
Fig. 2 is a schematic diagram of the electrical controlling circuit for the drive shown in Fig. 1.
Figure 3:
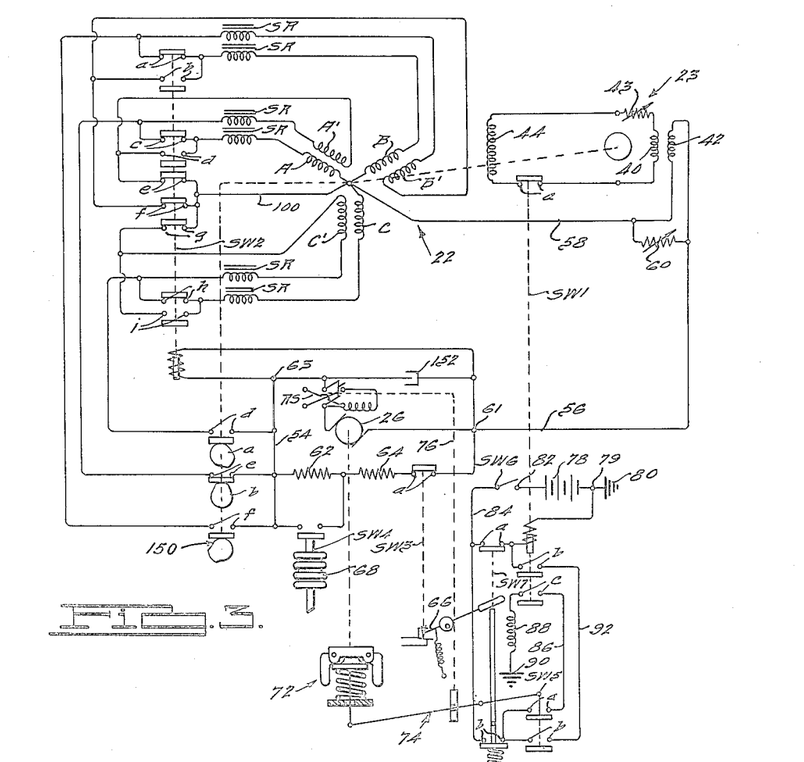
Fig. 3 is a schematic diagram showing a modified form of electrical circuit utilizing mechanically-actuated switches for rectifying the alternating power.
Figure 5:
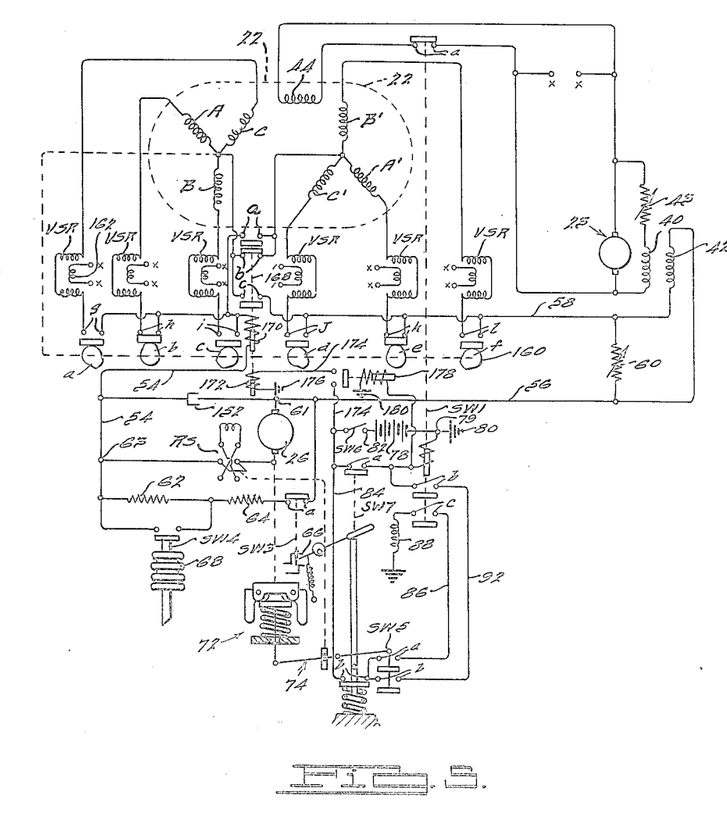
Fig. 5 is a schematic view showing a further modified form of electrical circuit utilizing mechanically-actuated rectifying switches.

Referring to the drawings, the numeral 1 designates generally a motor vehicle chassis having the usual internal combustion engine 2 connected for driving the rear wheels 4 of the vehicle. The engine 2 has an output shaft 6 driving a double planetary-type gear train generally designated 8 which drives the propeller shaft 10 connected with the rear wheels 4 through a differential mechanism 14. An input sun gear 15 is driven by shaft 6 which drives planet gear 16 of the planetary gear train 8 which mesh with the sun gear 15 and an output sun gear 17 secured to the shaft 10 and of lesser diameter than the sun gear 15. The planet gears 16 are journaled in a rotatable spider 18 which has a shaft portion 19 extending concentrically with the propeller shaft 10 for driving the rotors 20 and 21 of an alternator 22 and an exciter 23 respectively having stators 24 and 25 suitably held against rotation by any desired means (not shown). The electrical output of the alternator 22 is controlled by the exciter 23 and is transmitted by a control circuit such as is shown in Figs. 2, 3 or 5 for driving an electric motor 26 having an output pinion 28 meshing with a gear 30 suitably connected to the propeller shaft 10 by means to be later described. If desired, a pair of motors 26 may be utilized instead of the single motor 26 as shown in this case, which pair of motors may be arranged to operate in series and parallel relationship such as is shown in the said application, Serial No. 681,630.

An electrically-operated clutching mechanism 32 selectively couples the spider 18 directly to the output shaft 6 of the engine 2 to provide a direct drive from the engine 2 to the propeller shaft 10. An overrunning clutch 34 is provided between the shaft 6 and the spider 18 to prevent rotation of the spider 18 at a slower rate than the shaft 6. The shaft 10 comprises two sections 10a and 10b, the section 10a being directly connected to the sun gear 17, while the section 10b is directly coupled to the differential mechanism 14. A clutch mechanism 36 is operable in one position to couple the shaft section 10b to the shaft section 10a and in its other position to uncouple the shaft section 10b from section 10a and to couple the shaft section 10a to a concentrically extending portion 37 held against rotation for locking the shaft section 10a against rotation. The gear 30 is preferably coupled to the propeller shaft section 10b by means of an overrunning clutch 36 which operates in the usual overrunning manner for forward direction of the motor vehicle except when dynamic braking, later to be noted in detail, is applied but which, when the motor vehicle is to be operated in a backward or reverse direction, is locked securely to shaft section 10b by operation of the lever 39 whereby reverse rotation of the gear 30 by the pinion 28 will cause the shaft section 10b to rotate in a reverse direction.

The exciter 23 has a usual rotor 21 and a pair of field windings 40 and 42. The winding 40 cooperates with the exciter 23 in the usual manner of a self-excited direct-current generator in which the excitation of the winding 40 is controlled by means of a variable resistor 43. The winding 42 is arranged to oppose the excitation provided by the field winding 40 so that when high current is being generated by the alternator 22, the excitation thereof, as controlled by its field winding 44, is reduced in a manner to be more specifically set forth hereinafter. One terminal 46 of the exciter 23 is directly connected to one terminal of the field winding 44 of the alternator 22, while the other terminal 48 of the exciter 23 is connected through contacts $a$ of relay SW1 to the opposite terminal of the field winding 44.

The alternator 22 comprises in essence two three-phase windings having the phases A, B, and C and A', B' and C', respectively, having their phase relationship such as are diagrammatically shown in Fig. 2. This relationship of alternator may be provided by winding a six-phase alternator and interconnecting the alternate phases in Y connection whereby two sets of three-phase windings arranged with corresponding phases spaced 180° apart may be provided. In some instances, it may be desirable to wind the alternator 22 with the corresponding phases A—A', B—B', and C—C' in the same sets of slots and arranged whereby they may be connected in parallel or in series relationship.

Each of the individual terminals of the phases A, B, and C are connected by means of conductors to the anodes of discontinuous-type control valves V1, V2, and V3 respectively. The common junction of the phases A, B, and C are connected by means of a conductor 50 to one of the sets of contacts $b$ and $c$ of the relay switch SW2. The other of the set of contacts $b$ is connected by a conductor 52 to the common terminal of the phases A', B', and C'. The other of the set of contacts $c$ is connected to the anodes of the valves V4, V5, and V6 respectively, the valves V4, V5, and V6 being of the same general type as the valves V1, V2, and V3. Each of the cathodes of the valves V1, V2, and V3 is connected together to a conductor 54 and through the contacts $a$ of the switch SW2 to the conductor 52 connected to the common terminal of the phases A', B', and C'. The individual end terminals of the phases A', B', and C' are each connected by individual conductors to the cathodes of the valves V4, V5, and V6 respectively. One terminal of the energizing winding of the switch SW2 is connected to the conductor 54 and its other terminal is connected by means of a conductor 56 to one terminal of the opposing energizing winding 42 of the exciter 23. The other terminal of this winding 42 is connected by means of a conductor 58 to the common conductor which connects to the anodes of the valves V4, V5, and V6. A variable current-controlling resistor 60 is arranged in shunt circuit with the coil 42 between the conductors 56 and 58 whereby the relative amounts of current flowing through the variable resistor 60 and through coil 42 may be controlled.

The motor 26 which is of the series-wound direct-current type has one terminal 61 thereof directly connected to the conductor 56 and its other terminal 63 directly connected to the conductor 54 whereby it is arranged in parallel circuit with the energizing winding of the relay switch SW2. A usual reversing switch RS is provided for the motor 26 whereby the polarity of the field may be selectively controlled relative to the armature whereby the direct current motor 26 may be made to run in either direction. Preferably the lever 39 is mechanically coupled to the switch RS for concurrent operation therewith. Also connected across the terminals of the motor 26 are two series-connected dynamic braking resistors 62 and 64, the circuit through which is controlled by the contacts $a$ of the switch SW3 operated by the engine throttle 66 and the switch SW4. The switch SW3 is arranged so that the contacts $a$ thereof are closed when the engine 2 is in idle operation. The resistor 62 is selectively shunted by the switch SW4 operated by a suitable pressure element 68 in connection with the usual hydraulic brake system 70 of the motor vehicle. When a predetermined pressure has been reached within the hydraulic brake system 70, the switch SW4 will be closed, shunting out the resistor 62 for dynamic braking of the motor 26.

A governor generally indicated 72 is driven in accordance with the speed of the motor 26 and/or the vehicle 1 and operates, at a predetermined vehicle speed, through a lever system generally designated 74 to close the contacts $a$ and $b$ of a switch SW5 for a purpose to be described in detail hereinafter. The reversing switch RS is coupled as diagrammatically shown by the dotted line 76 to lock the lever system 74 when the reversing switch is in a position to cause reverse rotation of the motor 26 whereby the governor 72 is rendered ineffective to actuate the lever system 74 for closing the contacts $a$ and $b$ of the switch SW5, the purpose for all of which will be described in detail hereinafter.

One terminal 79 of a battery 78 is directly connected to one terminal of the energizing winding of the switch SW1 and also to ground as indicated at 80. The other terminal 82 of the battery 78 is connected through a switch SW6 which is preferably actuated in accordance with the ignition switch for the engine 2, through the contacts $a$ of an accelerator-actuated switch SW7 directly to the other terminal of the energizing winding for the switch SW1. The terminal 82 of the battery 78 is also connected through a conductor 84 and through normally closed contacts $b$ of the switch SW7 to one each of the contacts $a$ and $b$ of the switch SW5. The other contact $a$ of the switch SW5 is connected by means of a conductor 86 to one of the contacts $c$ of the switch SW1. The other one of the contacts $c$ of the switch SW1 is connected to one terminal of the clutch-actuating coil 88, the other terminal of which is connected to ground as at 90. The other contact $b$ of the switch SW5 is connected by means of a conductor 92 to one of the contacts $b$ of the switch SW1. The other contact $b$ of this switch SW1 is directly connected to the same terminal of the energizing winding for the switch SW1 as is the switch SW6.

It is believed that the remaining details of the system as shown in Figs. 1 and 2 may be best described by a description of operation thereof, which is as follows:

Very briefly stated, the engine 2 is started in any well-known manner and drives the sun gear 15 through its output shaft 6. Rotation of this gear 15 will rotate the planet gears 16 either bodily or about their own axes as will presently be described. The switch SW6 is interconnected for operation simultaneously with or prior to the starting of the engine 2 and acts to energize the relay switch SW1 whereby the contacts $a$ thereof are opened to maintain the winding 44 de-energized and substantially eliminate any torque on the spider 18. Upon opening of the throttle 66, the contacts $a$ of the switch SW7 will open and de-energize the relay switch SW1, thereby closing its contacts $a$ and energizing the alternator field 44. Energization of the field 44 introduces torque reaction to the spider 18 which controls the torque applied to the shaft 10. Since the shaft 10 is connected to the wheels 4, and assuming that the vehicle is parked, the torque required to rotate the shaft 10 will be high and a substantial torque reaction must be applied by the alternator 22 before any rotation of the shaft 10 will occur. The output of the alternator 22 is fed, as will be described in greater detail below, to the motor 26; and since motor 26 is geared to the shaft section 10a, will be applied to aid in rotation of shaft 10 and the rear wheels 4. After the vehicle has attained a predetermined speed, the governor 72 will close the contacts $a$ and $b$ of the switch SW5 so that when the operator releases the throttle 66 to close the contacts $a$ of the switch SW7 for energizing the switch SW1, a holding circuit will be established from the terminal 82 through switch SW6, conductor 84, contacts $b$ of the switch SW7, contacts $b$ of the switch SW5, and contacts $b$ and the coil of the switch SW1 to the battery terminal 79. A circuit is also completed through the contacts $a$ of the switch SW5 and contacts $c$ of the switch SW1 to energize the coil 88 of the clutch 32 whereby the spider 18 is locked for unison rotation with the shafts 6 and 10.

More specifically, the system is placed in idling condition by starting the engine 2 in a manner usual for the type of engine used and such starting will be accompanied by the closure of the usual starting switches, not shown. Switch SW6 is arranged as by a mechanical interlock, not shown, to be closed by such starting operation. Closure of the switch SW6 completes a circuit from the terminal 82 of the battery 78 through the contacts $a$ of the switch SW7 and through the energizing winding of the switch SW1 back to the battery terminal 79, whereby the switch SW1 is energized, opening the contacts $a$ thereof and closing the contacts $b$ and $c$ thereof. Closure of the contacts $b$ and $c$ thereof is without immediate effect, since the contacts $a$ and $b$ of the switch SW5 are held in open-circuit position by the governor 72. Opening of the contacts $a$ of the switch SW1 deenergizes the exciting winding 44 of the alternator 22 so that subsequent rotation of the alternator 22 will not cause a voltage to be generated thereby. Operation of the engine 2 will rotate its shaft 6 which acts through the gear train 8 to rotate the shaft 19 of the alternator 22 and the exciter 23. Since the contacts $a$ of the switch SW1 are now open due to the closed condition of the contacts $a$ of the switch SW7, the alternator 22 will have no significant output voltage and motor 26 will not rotate.

To initiate movement of the vehicle 1 from its parked condition and from the just-described idling condition of the system, the accelerator or throttle 66 is moved toward open position. This will increase the energy output of the engine 2 and open the contacts $a$ of the switch SW3 to disconnect the dynamic braking system and open the contacts $a$ of the switch SW7. Opening of the latter contacts de-energizes the switch SW1 causing the contacts $a$ thereof to close and the contacts $b$ and $c$ thereof to open. Closure of these contacts $a$ connects the output voltage of the exciter 23 to the exciting winding 44 of the alternator whereby the alternator will be caused to generate an output voltage. Opening of these contacts $b$ and $c$ is without effect, since the contacts $a$ and $b$ of the switch SW5 are in open-circuit position. As the speed of the engine 2 is increased by the accelerator 66, the speed of rotation of the shaft 19 will increase, thereby increasing the output of the alternator 22. Since initially the shaft 10 is stationary, due to the parked condition of the vehicle 1 and the high torque required for rotation thereof and initial movement of the vehicle, the engine 2 will rotate the shaft 19 and the shaft 10 initially will absorb the reaction torque without rotation. As the torque transmitted to the shaft 10 increases above that required to rotate the same, the shafts 10 and 19 will rotate in accordance with the torque required for their respective rotation, and the relative speeds thereof consequently will be variable.

The output voltage of the alternator 22 is fed to the valves V1 through V6 inclusive. Since this voltage is initially relatively small, insufficient current will flow through the energizing winding of the switch SW2 to actuate the same, the contacts $a$ and $c$ thereof will remain in closed-circuit condition, and the contacts $b$ thereof will remain open. Through an easily traced circuit it will be obvious that with the contacts $a$ and $c$ of the switch SW2 closed, the phases A, B and C and phases A', B' and C' of the alternator 22 will be respectively in parallel-circuit condition. This arrangement provides high current at low voltage for the motor 26 which at this time is just beginning to rotate and consequently will have a very low back E. M. F. Since the output current of the alternator 22 flows through the auxiliary or bucking winding 42 of the exciter 23, initially the high current will maintain a low output voltage of the alternator 22 so that the current output thereof is kept within safe limits and the power output thereof is kept within the rated power output of the engine 2. Preferably, the current voltage output relationship of the alternator is controlled so that the product of the two is substantially constant and equal to the rating of the engine 2 at the speed at which it happens to be running. As the speed of rotation of the motor 26 increases, the back E. M. F. will increase and at some given desired value of the back E. M. F. will be sufficient to cause actuation of the switch SW2 and open the contacts $a$ and $c$ thereof and close the contacts $b$ thereof, whereby the phases A, B and C and A', B' and C' are changed from their present parallel connection to a series connection. By such an arrangement, the alternator 22 will at no time require more power than the engine 2 will produce and the maximum current output may be obtained with minimum size of alternator.

In parallel operation, current from the phase A flows outwardly through the free terminal thereof, through the valve V1, through the conductor 54, through the motor 26, through conductor 56, through the winding 42, and through conductor 58 back through the now-closed contact c of the switch SW2 to the other terminal of the phase A. Current will also flow from the common terminal of phase A' which, it will be noted, is displaced electrically 180° from phase A, through the conductor 52, through the now-closed contacts a of the switch SW2 to the conductor 54 where it will follow the same path through the motor 26 and the energizing winding 42 of the exciter 23 and return through the conductor 58 through the valve V4 back to the other terminal of the phase winding A'. Similarly when the voltage relationships are right for the phases B and C and B' and C', current will flow from these phases through a path substantially as described in connection with the phases A and A'.

Current during series operation flows outwardly from the free terminal of phase A through the valve V1 to the conductor 54 whence it flows through the motor 26, through conductor 56, through the winding 42 and conductor 58, and through the valve V4, through the phase A', it being remembered that phase A' is located electrically 180° out of relationship with the phase A, and through conductor 52 and now-closed contacts b of the switch SW2 back to the other common terminal of the phase A. The circuits for the phases B and C and B' and C', when their voltage relationships are suitable, are substantially the same as that described for phases A and A'.

As the speed of the motor 26 and consequently of the vehicle 1 increases, the governor 72 will actuate its lever linkage 74 to close the contacts a and b of the switch SW5. Subsequent temporary closure of the throttle 66 closes the contacts a of the switch SW7 whereby the relay switch SW1 is energized through the closed switch SW6 whereby the contacts b and c of the switch SW1 are closed and its contacts a opened. Closure of the contacts b of the switch SW1 establishes a circuit from the battery terminal 82, through the switch SW6, through the closed contacts b of the switch SW7, through the contacts b of the switch SW5 and the closed contacts b of the switch SW1, whereby the energizing winding of the switch SW1 is energized through the holding circuit just described, so that subsequent opening of the contacts a of switch SW7 is without effect. Closure of the contacts c of the switch SW1 establishes a circuit, as above described, from terminal 82 to the contacts b of switch SW7 and therefrom through the closed contacts b of the switch SW5 and contacts c of the switch SW1 for energizing the clutch coil 88 which locks the spider 18 for synchronous rotation with the engine output shaft 6. Continued operation of the vehicle under control of the accelerator 66 will be accomplished through a direct mechanical drive transmitted to the shaft portion 10a by the planet gears 16 which are bodily rotated and held against rotation about their own axis by the spider 18 held by the clutch 32 to the shaft 6.

If now it is desired to place the motor vehicle 1 again in electric drive, the accelerator 66 is opened wide whereby a pin 100 carried by the actuating rod of the switch SW7 engages the closing member for the contacts b whereby the same are opened and the holding circuit through the energizing winding of the relay SW1 is de-energized as well as the clutch coil 88. The de-energization of the switch SW1 closes the contacts a thereof and opens the contacts b and c thereof. Closure of the contacts a of the switch SW1 connects the exciter 23 to the exciting winding 44 of the alternator 22 whereby it is again in a condition to generate electrical energy, and the vehicle will be driven as before described. As long as the speed of the vehicle is above the speed of which the governor 72 closes the contacts a and b of the switch SW5, movement of the accelerator 66 to idle position again will place the vehicle in direct mechanical drive as before described.

When the speed of the vehicle, during its normal operation, decreases so that the governor 72 acts to open the contacts a and b of the switch SW5 so that, irrespective of the condition of contacts b of the switch SW7, the holding circuit for the switch SW1 will be opened to de-energize the switch SW1 for closing its contacts a and opening its contacts b and c. Opening of these switches acts to de-energize the clutch coil 88. Closure of the contacts a of the switch SW1 causes the exciter 23 to energize the exciting winding 44 and the alternator 22 to operate as above described under control of the back E. M. F. of the motor 26 for determining the parallel and series relationship of the phases A, B, C and A', B', C' respectively.

When it is desired to drive the vehicle rearwardly, the reversing switch RS is thrown to reversed position. A lever 92 will be actuated to actuate the clutch 36 to lock the shaft section 10a against rotation. Lever 39 will also be actuated to render the overrunning clutch 38 ineffective whereby the gear 30 is locked to the shaft section 10b. Movement of the switch RS reverses the polarity of the field relative to the rotor of the motor 26. Through mechanical interconnection diagrammatically shown by the dotted line 76, a holding connection for the lever system 74 is provided whereby the switch SW5 will be maintained open irrespective of the operation of the governor 72. Because the shaft section 10a is now locked against rotation, rotation of the output shaft 6 of the engine 2 will rotate the sun gear 15, causing axial rotation of the planet gears 16 which rotate about the stationary sun gear 17 whereby the spider 18 will drive the rotors of the alternator 22 and exciter 23. The alternator 22 acts to generate an output voltage which is applied to the motor 26 as above set forth, except that because of the new polarities of the field and rotor of the motor 26 it will be rotating in the opposite direction. Since the lever 39 has locked the overrunning clutch 38 so that the gear 30 is effectively locked to the shaft section 10b, reverse rotation of the motor 26 will operate the vehicle 1 in a reverse direction. Such reverse drive is purely electrical under control of the alternator 22. The interlock 76 between the reversing switch RS and the switch SW5, whereby the contacts a and b thereof are maintained open, prevents any operation of the governor 72 or of the accelerator 66 from energizing the clutch coil 88 whereby the spider 18 might be locked for unitary rotation with the output shaft 6 of the motor 2.

When it is desired to stop the vehicle, lever 39 is moved to lock up overrunning clutch 38 such that gear 30 is effectively locked to the shaft section 10b similarly as noted above for reverse drive or back-up of the vehicle and the throttle 66 is closed, closing the contacts a of the switch SW7, thereby energizing the switch SW1 whereby the contacts a thereof will open and de-energize the alternator 22. Such movement of the throttle 66 will also close the contacts a of the switch SW3, thereby connecting the resistors 62 and 64 across the output of the motor 26 to provide a load, for the motor 26 will now regenerate and dynamically brake the vehicle 1. If it is desired to slow down still further, the foot brake FB is pushed further, causing the pressure in the actuator 68 to close the contacts of the switch SW4 to thereby short out the resistor 64 and increase the dynamic braking effect of the motor 26. Further inward movement of the foot brake FB will apply the usual mechanical friction brakes.

The system shown in Fig. 3 is quite similar to that shown in Fig. 2, except that switches are used to rectify the current, and the series-parallel connections for the phase windings A, B and C and A', B' and C' are made on the alternating current side of the electrical circuit. In this form, the common terminal of the phases A, B and C are connected by means of a conductor 100 to one each of the contacts e, f, and g of the switch SW2. The opposite end of each of the phase windings A, B and C are respectively connected through saturable reactors SR, the phase A being connected to one each of the contacts c and d of the switch SW2, the phase B being connected to one each of the contacts a and b of the switch SW2, and the phase C being connected to one each of the contacts h and i of the switch SW2. The outward end of the corresponding phase windings A', B' and C' are respectively connected through saturable reactors SR to the other of each of the contacts c, a and h respectively. The inner ends of the phase windings A', B' and C' are respectively connected to the switch SW2, the phase A being connected to the other of each of the contacts d and e, the phase B' being connected to the other of each of the contacts b and f, and the phase C being connected to the other of each of the contacts g and i. With the switch SW2 in its de-energized position as shown, the contacts a, c, e, f, g, and h will be closed and the contacts b, d, and i will be open, whereby the phases A, B and C will be respectively parallel with the phases A', B' and C'. With the switch SW2 in its energized position, the contacts a, c, e, f, g, and h are open and the contacts b, d, and i are closed, and the phases A, B and C will be respectively in series with the phases A', B' and C'.

The center terminals of the phases A', B' and C' are connected together by closure of the switch contacts e, f, and g of the switch SW2, and closure of its contacts c, a, and h connects the outer ends of the phases A', B' and C' to the outer ends of the phases A, B and C respectively. Referring specifically to the phases A and A' with the switch SW2 in its energized position, the circuit may be traced from the common terminal of the phase A through the phase A and outwardly through the saturable reactor SR associated therewith to one of the contacts d of the switch SW2, from the other of the closed contacts d of the switch SW2, through a conductor to the inner end of the phase A' and outwardly therethrough, through the saturable reactor SR, to the contacts e of a rectifying switch 150 mechanically coupled for drive by the alternator 22. When this switch is in the proper position, the circuit will continue on across through these closed contacts e, through the motor 26, and through the winding 42 to the inner or common terminal of the phase A. A similar series circuit is provided for the phases B and B' and C and C' respectively through the switches SW2 and 150. The switch 150 is of rotary-actuated type comprising cams a, b, and c for closing the contacts d, e, and f respectively and is so arranged that at least one of the sets of contacts d, e or f is closed at all times. The cams a, b and c of the switch 150 are directly and mechanically driven in accordance with the rotation of the alternator 22 and are arranged so that they will close the circuit therethrough in a predetermined timed relationship with respect to the voltage wave of the various phases of the alternator 22 as is diagrammatically shown in Fig. 4.

Figure 4:
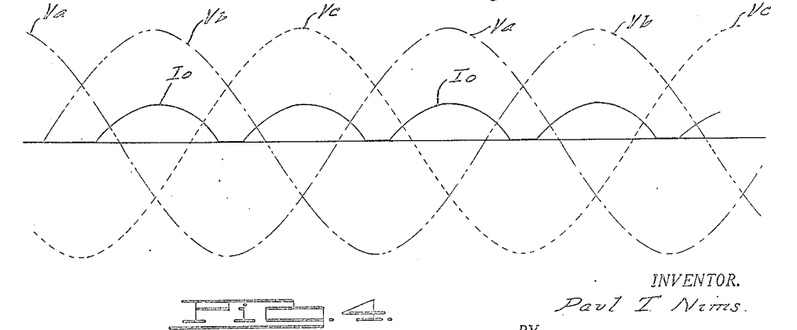
Fig. 4 is a schematic view of the wave shape of the current flow through the mechanically-actuated switches showing the substantially zero current portion during the period in which the switches are actuated.

Referring to Fig. 4, the reference character $Va$ indicates the voltage wave produced by the phases A and A', while the reference characters $Vb$ and $Vc$ indicate respectively the voltage waves of the B—B' and C—C' phases of the alternator and their respective phase relationship. It will be noted that only the positive half cycles of the voltage waves are made use of and therefore in effect the system operates as a half-wave rectifier. As the magnitude of the voltage wave $Va$ passes its crest, it will then diminish; and at a point just before it crosses the rising voltage wave $Vb$, the line current flowing to the motor as represented by the reference character $Io$ will become zero and remain zero until the wave $Va$ crosses the increasing voltage wave $Vb$. It is during this zero value of current that the switch contacts e of the switch 150 are opened. Preferably, the contacts f are closed slightly before the contacts e are opened so that at no time is the alternator 22 disconnected from its motor and condenser load circuit.

Preferably the contacts e and f of the switch 150 are arranged to be opened and closed respectively substantially at the instant that the decreasing voltage wave $Va$ crosses the increasing voltage wave $Vb$, since due to the effect of the reactors, to be more fully described below, the current $Io$ is zero for a substantial time before and after the interval that the voltage waves $Va$ and $Vb$ cross. It is a desiderative but not an essential that the contacts e and f of the switch 150 are actuated at this exact instant. However, by designing these contacts to open and close respectively at this instant any slight variation in timing of the voltage wave with respect to the operation of the switches or tolerance in the manufacture of various switches which may render their operation slightly variable will not place their operation outside the flat portion of the current wave $Io$.

Subsequently, the contacts f of the switch 150 will remain closed throughout the increasing value of the voltage wave $Vb$ and along its decreasing value until substantially the time that the decreasing voltage wave $Vb$ crosses the increasing voltage wave $Vc$. As occurred upon the decreasing voltage wave $Va$, the current $Io$ will fall to zero value slightly ahead of the intersection of the two voltage waves $Vb$ and $Vc$ and will remain zero until a time which is slightly after the voltage wave $Vc$ has increased above the value of the voltage wave $Vb$. The contacts f will open and the contacts d of the switch 150 will close during this zero value of the current $Io$ and preferably are designed to open and close respectively at the instant the voltage Vb is equal to the voltage Vc. Subsequently, the voltage Vc will pass through its crest and again decrease while the voltage Va will again rise so that the current Io will again fall to zero. The contacts d and the contacts e of the switch 150 will open and close respectively during this zero value of the current Io, and the phases A and A' will again be connected to supply current to the condenser-motor load circuit.

The cams a, b and c of the switch 150 are arranged substantially 120° apart, whereby the contacts d, e, and f associated therewith will be closed and opened in the manner before described to connect the various phases of the alternator 22 in sequence to the load circuit and connected at such time that the current output of the alternator 22 to the load circuit is of zero value so that there will be no arcing at the switch 150. Such arcing would, of course, have a deleterious effect upon the contacts and would quickly render the switch 150 inoperative.

Saturable reactors SR associated with each of the phases A, B and C and A', B' and C' are provided so that upon initial current-flow in any direction through the various phases, the reactors will absorb the entire phase output voltage. At greater current flows, the reactor will become saturated so that its effect on current flow therethrough will be substantially that of pure resistance equal in magnitude to the resistance of the reactor. This resistance is purposely maintained very low to increase the output efficiency of the electrical system.

The voltage of the output circuit as measured across the terminals of the motor 26 will be determined primarily by the speed of the motor, whose back E. M. F. is determined primarily by its speed of rotation. Because of this, the decreasing value of the voltage wave Va will approach the back E. M. F. of the motor 26, and as it so approaches this back E. M. F. which is maintained across the motor 26 and the terminals of the condenser 152, the current output of the phase producing the voltage wave Va will decrease, and if the contacts of the switch 150 connecting the phases A and A' were not opened the current would reverse in its flow direction. At the instant of attempted reversal, the reactors SR associated with these phases will be completely void of flux and as these reactors again tend to become saturated in the reverse direction the current flow therethrough will be substantially zero, it being remembered that the magnetizing current of the reactors is a very small portion of the load current. The current flow through the contacts e of the switch 150 as represented by the line Io will fall to substantially zero and will be held at this value for an appreciable time interval. Likewise, when the contacts f of the switch 150 are closed to connect the voltage wave Vb to the motor-condenser circuit, the initial voltage differential between that represented by the wave Vb and that maintained across the terminals of the motor 26 and the condenser 152 will be small and a small current flow will attempt to start. Due to the fact that the saturable reactors SR connected with the phases B and B' have not become saturated, the voltage drop across the reactors will prevent any substantial current flow across the contacts f of the switch 150 for a predetermined time interval until the current value has saturated the reactor SR, thereby permitting the current Io to flow.

Since the back E. M. F. of the motor 26 will remain substantially constant and in general proportion to the speed of its rotation, the condenser 152 tends to be charged by the flow of current Io and to discharge into the motor 26 when the current flow Io is insufficient to satisfy the needs of the motor 26. Broadly, therefore, the motor 26 may be considered to be supplied with electrical energy from the condenser 152 which is intermittently charged by the alternator 22 under control of the switch 150. In other respects, the system shown in Fig. 3 is similar to that shown in Fig. 2 in that the voltage of the alternator 22 is controlled in accordance with the current flow of the motor 26 and the phase windings thereof will be arranged in series and parallel connection in accordance with the back E. M. F. of the motor 26. It differs in that the switching of the phases to series and parallel arrangement occurs in the alternating current circuits intermediate the phases and the rectifying means rather than as shown in Figs. 2 and 5 in the unidirectional current circuit intermediate the rectifying means and the load. The operation of the electrical system in connection with the operation of the vehicle is substantially as set forth in the more detailed explanation of the form shown in Fig. 2.

The form as shown in Fig. 5 includes a cam-actuated switch 160 directly driven by the alternator 22 having the cams a, b, c, d, e and f and contacts g, h, i, j, k and l associated for actuation by the respective cams. It will be noted that the alternator is arranged similarly to that disclosed in Fig. 2; and the switch SW2, for arranging the phase windings A, B and C and A', B' and C' respectively in series and parallel relationship, is located in the unidirectional current circuit and is operated not according to the back E. M. F. of the motor but by the current flow therethrough. With the switch SW2 in the unidirectional current circuit, a rectifying switch must be used for each of the phases in series with saturable reactors VSR. The reactors VSR are of the type in which the core may be magnetized in one direction or the other by means of a direct current winding 162 having output terminals xx which are respectively connected across the potential which supplies the energizing current for the field 44 of the alternator 22. In this manner the degree of saturation of the reactors VSR may be varied in direct accordance with the current flow through the various phases of the alternator 22. When the motor-condenser load circuit draws only a small current and if the saturation of the reactors VSR is not altered, a relatively long flat portion on the curve Io as shown in Fig. 4 is provided. If the current supplied by the various phases of the alternator 22 was of much greater magnitude, this flat portion of the curve Io would be decidedly of shorter length.

It is the purpose of this form of the invention to vary as necessary the length of the flat portion of the curve Io to meet the various current output demands of the alternator 22. This is accomplished by suitably pre-magnetizing the reactors VSR so that when high current output of the alternator 22 is being delivered, the degree of pre-magnetization of the reactors VSR is substantially lowered so that the current flow from the alternator 22 at the time that the current wave Io breaks away from its flat portion is substantially greater than when the output current of the alternator 22 is at a much lower value. Preferably, since the switch 160 is mechanically actuated and the variation and time intervals in which the various contacts thereof will be closed or opened by the cams a, b, c, d, e and f are substantially constant, it becomes desirable to so arrange the saturation of the saturable reactors VSR to produce flat portions on the current wave Io of substantially equal time length irrespective of the current output of the alternator 22 as determined by the condenser motor load circuit.

The switch 168 of Fig. 5 corresponds generally to the switch SW2 of the other figures and has a pair of energizing coils 170 and 172. The coil 170 is connected in series with conductor 54. The contacts a and c of the switch 168 are normally open while the contacts b are normally closed. Therefore, when the back E. M. F. of the motor 26 is low and high current is flowing, the contacts a and c will be closed placing the phases A—A', B—B' and C—C' respectively in parallel. When the motor current is below a predetermined value, the switch 168 will be in its deenergized position with its contacts a and c open and its contacts b closed whereby the phases A—A', B—B' and C—C' will be respectively in series. Since when the vehicle 1 is parked and the engine 2 is idling no current is flowing through the coil 170, the switch 168 would be in the de-energized position when it should be in the energized position. Consequently, the second coil 172 is provided to maintain the switch 168 in an energized position whenever the engine 2 is idling. Current for the coil 172 is furnished by the battery 78. A conductor 174 connects the conductor 84 to one end of the coil while the other end is connected to the terminal 79 through the ground connections 176 and 80. The contacts of a time delay relay 178 control the circuit through the conductor 174. One terminal of the energizing coil of the relay 178 is connected to the terminal of the energizing winding of the switch SW1 which is directly connected to the contacts a of the switch SW7 so that it will be energized in accordance with the energization of the switch SW1. The other terminal of the coil of the relay 178 is grounded as at 180. The relay 178 will close its contacts substantially immediately upon energization of its coil but will retain its contacts closed for a short time interval after deenergization of its coil, whereby it maintains the coil 172 energized until the current flow through the coil 170 is indicative of the running condition of the motor 26 and vehicle 1. Since current flow through the coil 170 subsequent to initial operation of the motor 26 at any given time is generally proportional to the back E. M. F. of the motor 26, the functioning of the series-parallel switch 168 will be substantially the same as that of the switch SW2 and a further more detailed explanation of its operation is deemed unnecessary to a complete understanding of the invention. It is believed that since the operation of the remainder of the control circuit by which the alternator 22 drives the motor 26 for movement of the vehicle is similar to that described above in connection with Fig. 2 that a further detailed description is not warranted.

It is believed that it will be obvious from the foregoing that numerous modifications and changes in circuit arrangement and in the various timing and arranging of the operation of the circuit elements may be made within the spirit and scope of the present invention. It is desired that the scope of this invention be limited solely by the scope of the hereinafter appended claims.

What is claimed and is desired to be secured by United States Letters Patent is as follows:

I claim:

1. In an electrical network, an alternator having a plurality of pairs of phase windings, a unidirectional current electric motor, circuit means including rectifying means and an electric switch connecting said motor to said alternator, said switch means being positioned intermediate said rectifying means and said alternator and operable to connect each of said pairs of phase windings in series circuit at back electromotive forces of said motor above a predetermined value and to connect each of said pairs of phase windings in parallel circuit at back electromotive forces of said motor below said value.

2. The combination of claim 1 in which said switch means is positioned intermediate said rectifying means and said motor.

3. In an electrical system wherein an alternator having at least two phase windings is adapted to be driven by a source of energy and is adapted to drive an electric motor arranged to drive a load, an electrical network interconnecting the alternator with the motor comprising circuit means including a switch for connecting the alternator phases in parallel relation when said switch is in a first position and in series relation when said switch is in a second position, magnetic means for operating said switch to said positions, and circuit means connecting said magnetic means across the motor whereby it is responsive to the back electromotive forces of the motor, said magnetic means being operable below a predetermined value of the back electromotive forces to actuate said switch to said first position and operable above said predetermined value of the back electromotive forces to actuate said switch to said second position.

4. In an electrical system wherein an alternator having at least two phase windings is adapted to be driven by a source of energy and is adapted to drive an electric motor arranged to drive a load, an electrical network interconnecting the alternator with the motor comprising circuit means including a switch for connecting the alternator phases to the motor in parallel relation when said switch is in a first position and in series relation when said switch is in a second position, magnetic means for operating said switch to said second position, and circuit means connecting said magnetic means to said network whereby it is responsive to the back electromotive forces of the motor, said magnetic means being operable above a predetermined value of the back electromotive forces to actuate said switch to said second position.

5. In an electrical system adapted to drive a vehicle, an alternator having at least two phase windings and adapted to be driven by a source of prime energy, an electric motor arranged to apply torque to the vehicle wheels, an electrical network interconnecting the alternator with the motor comprising circuit means including a switch for connecting the alternator phases to the motor in parallel relation when said switch is in a first position and in series relation when said switch is in a second position, magnetic means for operating said switch to said position, and circuit means connecting said magnetic means in circuit with said motor whereby said switch is moved to said positions in accordance with the speed operating characteristic of said motor, said magnetic means being operable above a predetermined value of motor current to actuate said switch to said first position and operable below said predetermined value of motor current to actuate said switch to said second position.

6. In an electrical system adapted to drive a vehicle, an alternator having at least two phase windings and adapted to be driven by a source of prime energy, an electric motor arranged to apply torque to the vehicle wheels, an electrical network interconnecting the alternator with the motor comprising circuit means including a switch for connecting the alternator phases to the motor in parallel relation when said switch is in a first position and in series relation when said switch is in a second position, magnetic means for operating said switch to said position, circuit means connecting said magnetic means in circuit with said motor whereby said switch is moved to said positions in accordance with the speed operating characteristic of said motor, said magnetic means being operable above a predetermined value of motor current to actuate said switch to said first position and operable below said predetermined value of motor current to actuate said switch to said second position, and voltage regulating means for said alternator actuated in response to the energy absorbed by said motor whereby the output of said alternator is maintained below a predetermined desired value.

7. In an electrical system adapted to drive a vehicle, an alternator having at least two phase windings and adapted to be driven by a source of prime energy, an electric motor arranged to apply torque to the vehicle wheels, an electrical network interconnecting the alternator with the motor comprising a rectifying circuit means, including a rotary rectifying switch having contacts for connecting each said alternator phase to said motor in a predetermined pattern, said switch being mechanically driven by said alternator, and saturable reactors in series with said phases, said switch being driven by said alternator and operable to open the contacts thereof solely during periods in which said reactors are unsaturated.

8. In an electrical system adapted to drive a vehicle, an alternator having at least two phase windings and adapted to be driven by a source of prime energy, an electric motor arranged to apply torque to the vehicle wheels, an electrical network interconnecting the alternator with the motor comprising a rectifying circuit means, including a rotary rectifying switch having contacts for connecting each said alternator phase to said motor in a predetermined pattern, said switch being mechanically driven by said alternator, saturable reactors in series with said phases, said switch being driven by said alternator and operable to open the contacts thereof solely during periods in which said reactors are unsaturated, and means controlling the magnitude of phase current required to saturate said reactors.

9. In an electrical control system, an alternator having output terminals and an exciter circuit, a unidirectional current load circuit for said alternator, circuit means including a switch operatively connecting said load circuit to said output terminals, saturable core reactor means in series circuit with one of said output terminals, means associated with said exciter circuit and operable to control the amount of alternator current required to saturate said reactor means, means including a bucking coil associated with said exciter circuit and being with it responsive to the magnitude of current supplied by said alternator to said load circuit for regulating said exciter circuit and control means, and pure mechanical means primarily and directly operable by motion of said alternator thereby being indirectly albeit positively locked in with the frequency of oscillation of the voltage generated by said alternator for closing said switch during periods in which the polarity of said terminals matches that of said load circuit, said switch closing means being operable to open said switch during the period in which said reactor means is being saturated and in which current flow therethrough is of substantially zero magnitude with respect to peak current flow.

10. In an electrical control system, an alternator having an exciter circuit and output terminals, a unidirectional current load circuit for said alternator, circuit means including a switch operatively connecting said load circuit to said output terminals, saturable core reactor means in series circuit with one of said output terminals, means controlled by said exciter circuit operable to control the amount of alternator current required to saturate said reactor means, means responsive to the magnitude of current supplied by said alternator to said load circuit for regulating said exciter circuit and control means, and other means for closing said switch during periods in which the polarity of said terminals matches that of said load circuit, said other means being driven directly by said alternator by a mechanical connection whereby exact synchronism therewith may be maintained at all times regardless of line disturbances and drastic speed fluctuations, and being operable to open said switch only during the period in which said reactor means is being saturated and in which current flow therethrough is of substantially zero magnitude with respect to peak current flow.

11. In an electrical control system, an alternator having a plurality of phases, a unidirectional current load circuit for said alternator, circuit means including a switch having a separate contact for operatively connecting each of said phases to said load circuit, saturable core reactor means in series circuit with each of said phases, means operable to control the amount of phase current required to saturate its respective said reactor means, means responsive to the magnitude of current supplied by said alternator to said load circuit for regulating said control means, means mechanically driven by said alternator for closing said switch during periods in which the polarity of said terminals matches that of said load circuit, said means being operable to open said switch during the period in which said reactor is being saturated and in which current flow therethrough is of substantially zero magnitude with respect to peak current flow, and means responsive to current flow through said load circuit to control the voltage of said phases.

12. In an electrical control system, an alternator having a plurality of phases, a unidirectional current load circuit for said alternator, circuit means including a switch having a separate contact for operatively connecting each of said phases to said load circuit, saturable core reactor means in series circuit with each of said phases, means operable to control the amount of phase current required to saturate its respective said reactor means, means responsive to the magnitude of current supplied by said alternator to said load circuit for regulating said control means, means mechanically driven by said alternator for closing said switch during periods in which the polarity of said terminals matches that of said load circuit, said means being operable to open said switch during the period in which said reactor is being saturated and in which current flow therethrough is of substantially zero magnitude with respect to peak current flow, and means responsive to current flow through said load circuit for grouping said phases in series and parallel connections.

13. In an electric drive for a vehicle having an engine, an alternator arranged to be driven by the engine and having a phase winding for supplying load current, a unidirectional current motor arranged to supply power to drive the vehicle, an electrical network interconnecting said alternator winding with said motor, voltage control means for said winding, means responsive to the current flow through said motor for regulating said voltage control means whereby the power output of said winding is maintained below a predetermined maximum, rotary switch means mechanically driven by said alternator and connected intermediate said winding and said motor for periodically connecting said winding to said motor in accordance with the magnitude and polarity of the voltage of said winding, and saturable reactor means in series circuit with said winding, said switch means being arranged in phase relation to said alternator voltage for disconnecting said motor from said winding solely during periods in which said reactor means is unsaturated.

14. The combination of claim 13 in which said reactor means has a control winding for determining the magnitude of load current required to saturate said reactor means, said voltage control regulating means being electrically connected to regulate the energizations of said control winding whereby said reactor means is variably premagnetized to provide for complete saturation thereof by said load current in substantially equal time intervals irrespective of variation in the magnitude of said load current.

15. In an electrical network, the combination with an alternator having a plurality of pairs of phase windings, an electric motor, and circuit means connecting said windings to said motor and including switch means having two positions of operation, said switch means when in one of its said positions being operable to connect each of said pairs of said windings in series circuit and when in another of its said positions being operable to connect each of said pairs of said windings in parallel circuit, of automatic means for actuating the switch means to said one position, said automatic means being responsive to an operating characteristic of said motor indicative of attainment of a predetermined minimum speed.

16. In an electrical system wherein a pair of multiphase rectifier banks each delivers its output into the load circuit through an individual common, the combination with an alternator for supplying the rectifier banks and having a plurality of pairs of windings, one winding of each pair being segregated into a group constituting one multiphase set of windings arranged in a permanent star-connection having a common to the center point, and the other winding of each pair being segregated as the cooperating multiphase set having another common to its center point, and means for forming contact terminals for said commons, of switch means for connecting said contact terminals to pair selectively each star common with a rectifier common and with one another whereby a parallel-series transition may be afforded said pairs of windings in supplying input to the rectifier banks.

17. In an electrical system wherein a pair of multiphase rectifier banks each delivers its output into the load circuit through an individual common, the combination with an alternator for supplying the rectifier banks and having a plurality of pairs of windings, one winding of each pair being segregated into a group constituting one multiphase set of windings arranged in a permanent star-connection having a common to the center point, and the other winding of each pair being segregated as the cooperating multiphase set having another common to its center point, and means for forming contact terminals for said commons, of switch means for connecting said contact terminals to pair selectively each star common with a rectifier common and with one another whereby a parallel-series transition may be afforded said pairs of windings in supplying input to the rectifier banks and an electromagnetic relay associated with said load circuit for responsively operating said switch means at predetermined load conditions.

18. In an electrical network an alternator having a plurality of pairs of phase windings, an electric motor circuit means connecting said windings to said motor and including switch means having two positions of operation, said switch means when in one of its said positions being operable to connect each of said pairs of said windings in series circuit and when in another of its said positions being operable to connect each of said pairs of said windings in parallel circuit, and automatic means for actuating said switch means to said one position in accordance with the predetermined desired operating characteristic of said motor of the attainment of a predetermined minimum self-induced E. M. F.

PAUL T. NIMS.

REFERENCES CITED

The following references are of record in the file of this patent:

UNITED STATES PATENTS

| Number | Name | Date |
| --- | --- | --- |
| 1,123,321 | Lamme | Jan. 5, 1915 |
| 2,018,646 | Caputo | Oct. 22, 1935 |
| 2,169,560 | Janetschke | Aug. 15, 1939 |
| 2,351,975 | Koppelmann | June 20, 1944 |